United States Patent
Deshpande et al.

(10) Patent No.: US 11,556,925 B2
(45) Date of Patent: Jan. 17, 2023

(54) ENSURING INFORMATION FAIRNESS AND INPUT PRIVACY USING A BLOCKCHAIN IN A COMPETITIVE SCENARIO GOVERNED BY A SMART CONTRACT

(71) Applicant: International Business Machines Corporation, Armonk, NY (US)

(72) Inventors: Pralhad Dinesh Deshpande, Singapore (SG); Muhammad Tayyab Asif, Singapore (SG); Yuan Yuan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 16/129,530

(22) Filed: Sep. 12, 2018

(65) Prior Publication Data

US 2020/0082399 A1    Mar. 12, 2020

(51) Int. Cl.
| | | |
|---|---|---|
| G06Q 20/38 | (2012.01) | |
| H04L 9/40 | (2022.01) | |
| H04L 9/30 | (2006.01) | |
| H04L 9/00 | (2022.01) | |

(52) U.S. Cl.
CPC .......... *G06Q 20/3829* (2013.01); *H04L 9/30* (2013.01); *H04L 63/0428* (2013.01); *G06Q 2220/00* (2013.01); *H04L 9/50* (2022.05)

(58) Field of Classification Search
CPC ............. G06Q 20/401; G06Q 20/3829; G06Q 20/389; G06Q 40/04; G06Q 10/10; G06Q 30/08; G06Q 2220/00; H04L 9/30; H04L 63/0428; H04L 9/50
See application file for complete search history.

(56) References Cited

U.S. PATENT DOCUMENTS

| | | | |
|---|---|---|---|
| 6,421,653 B1 * | 7/2002 | May ....................... | G06Q 30/08 705/36 R |
| 9,608,829 B2 | 3/2017 | Spanos et al. | |
| 9,849,364 B2 | 12/2017 | Tran et al. | |
| 10,673,626 B2 * | 6/2020 | Sandberg-Maitland ..................... | H04L 9/321 |
| 10,805,072 B2 * | 10/2020 | Corduan ................. | H04L 9/085 |
| 10,917,234 B2 * | 2/2021 | Mehedy .............. | G06F 16/1837 |
| 2007/0156499 A1 * | 7/2007 | Berger ................. | G06Q 10/087 705/7.27 |

(Continued)

FOREIGN PATENT DOCUMENTS

WO    2018019364 A1    2/2018

OTHER PUBLICATIONS

Antonopolous, "Mastering Bitcoin" 2011. (Year: 2011).*

(Continued)

*Primary Examiner* — Steven S Kim

(57) ABSTRACT

An example operation may include one or more of initializing a smart contract (SC) and appending it to a blockchain, registering each of a plurality of participants as a party to the SC, receiving from at least some of the participants an encrypted confidential input commitment, appending the encrypted input commitments to the blockchain, decrypting the encrypted input commitments, executing by the SC at least one business rule using the decrypted input commitments to obtain a business rule result, and identifying a prevailing participant based at least in part on the business rule result.

17 Claims, 5 Drawing Sheets

(56) References Cited

U.S. PATENT DOCUMENTS

| | | | | |
|---|---|---|---|---|
| 2015/0379510 | A1* | 12/2015 | Smith | H04L 9/3242 |
| | | | | 705/71 |
| 2017/0344988 | A1* | 11/2017 | Cusden | G06F 21/00 |
| 2018/0097779 | A1* | 4/2018 | Karame | G06Q 20/382 |
| 2019/0172282 | A1* | 6/2019 | Patel | G07C 9/27 |
| 2019/0188399 | A1* | 6/2019 | Palaniappan | G06F 21/64 |
| 2019/0258999 | A1* | 8/2019 | Leonard | G06Q 10/06312 |
| 2020/0044863 | A1* | 2/2020 | Yadlin | G06F 21/44 |
| 2020/0082336 | A1* | 3/2020 | Vuppala | G06F 16/27 |
| 2020/0351083 | A1* | 11/2020 | Bartolucci | H04L 9/3247 |
| 2022/0014354 | A1* | 1/2022 | Valladolid | H04L 9/3231 |
| 2022/0045867 | A1* | 2/2022 | Beery | H04L 9/3252 |

OTHER PUBLICATIONS

Dave Sad, "Testing time-dependent logic in ethereum Smart Contracts", Feb. 25, 2018 (Year: 2018).*

Stack Exchange, "What is the public key used to generate the genesis block?", 2016 (Year: 2016).*

S. Bartolucci, P. Bernat and D. Joseph, "SHARVOT: Secret SHARe-Based VOTing on the Blockchain," 2018 IEEE/ACM 1st International Workshop on Emerging Trends in Software Engineering for Blockchain (WETSEB), 2018, pp. 30-34.*

Anonymously; "System and Method to Enable Dynamic Change in Validation Rules in Blockchain Smart Contracts"; http://ip.com/IPCOM/000252904D; Feb. 20, 2018.

Anonymously; "System and Methods for Incorporating Fairness in Smart Contract Execution"; http://ip.com/IPCOM/000252943D; Feb. 22, 2018.

Kosba, A. et al.; "Hawk: The Blockchain Model of Cryptography and Privacy-Preserving Smart Contracts"; http://www.ieeexplore.ieee.org/document/7546538.pdf. 2015-2016.

Liu, J. et al.; "Towards Fairness of Cryptocurrency Payments"; http://www.arxiv:1609.07256v3; Dec. 1, 2016.

Marcus Stadler, Discusses secret sharing in his work "Publicly verifiable secret sharing", International Conference on the Theory and Applications of Cryptographic Techniques, Springer Berlin Heidelberg, 1996.

Berry Schoenmakers, "A simple publicly verifiable secret sharing scheme and its application to electronic voting". Annual International Cryptology Conference, Springer Berlin Heidelberg, 1999.

David Chaum and Torben Pryds Pedersen "Wallet databases with observers", Annual International Cryptology Conference, Springer Berlin Heidelberg, 1992.

* cited by examiner

ENSURING INFORMATION FAIRNESS AND INPUT PRIVACY USING A BLOCKCHAIN IN A COMPETITIVE SCENARIO GOVERNED BY A SMART CONTRACT

TECHNICAL FIELD

This application generally relates to smart contracts, and more particularly to ensuring information fairness and input privacy using a blockchain in a competitive scenario governed by a smart contract.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common example of a distributed ledger and may be used as a public ledger to store information. Although primarily used for financial transactions, a blockchain can store various information related to goods and services (e.g., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, a competitive business scenario, such as a bidding scenario, may be limited by an unequal distribution of information, even at settlement time. Furthermore, it may be difficult to guarantee the privacy of competitive inputs, such as by collusion between a bidder that is one of a plurality of bidders seeking to win a contract to provide a product or service to a client, and an administrator of the bidding process. As such, what is needed is a smart contract implementation that enforces information fairness while guaranteeing the privacy of inputs from competitive parties, to overcome these limitations.

SUMMARY

One example embodiment may provide a method that includes one or more of initializing a smart contract (SC) and appending it to a blockchain, registering each of a plurality of participants as a party to the SC, receiving from at least some of the participants an encrypted confidential input commitment, appending the encrypted input commitments to the blockchain, decrypting the encrypted input commitments, executing by the SC at least one business rule using the decrypted input commitments to obtain a business rule result, and identifying a prevailing participant based at least in part on the business rule result.

Another example embodiment may provide a system that includes a processor and memory, wherein the processor is configured to perform one or more of initialize a smart contract (SC) and append it to a blockchain, register each of a plurality of participants as a party to the SC, receive from at least some of the participants an encrypted confidential input commitment, append the encrypted input commitments to the blockchain, decrypt the encrypted input commitments, execute by the SC at least one business rule based on the decrypted input commitments to obtain a business rule result, and identify a prevailing participant based at least in part on the business rule result.

A further example embodiment may provide a non-transitory computer readable medium comprising instructions, that when read by a processor, cause the processor to perform one or more of initializing a smart contract (SC) and appending it to a blockchain, registering each of a plurality of participants as a party to the SC, receiving from at least some of the participants an encrypted confidential input commitment, appending the encrypted input commitments to the blockchain, decrypting the encrypted input commitments, executing by the SC at least one business rule using the decrypted input commitments to obtain a business rule result, and identifying a prevailing participant based at least in part on the business rule result.

DETAILED DESCRIPTION

Figure 1A:
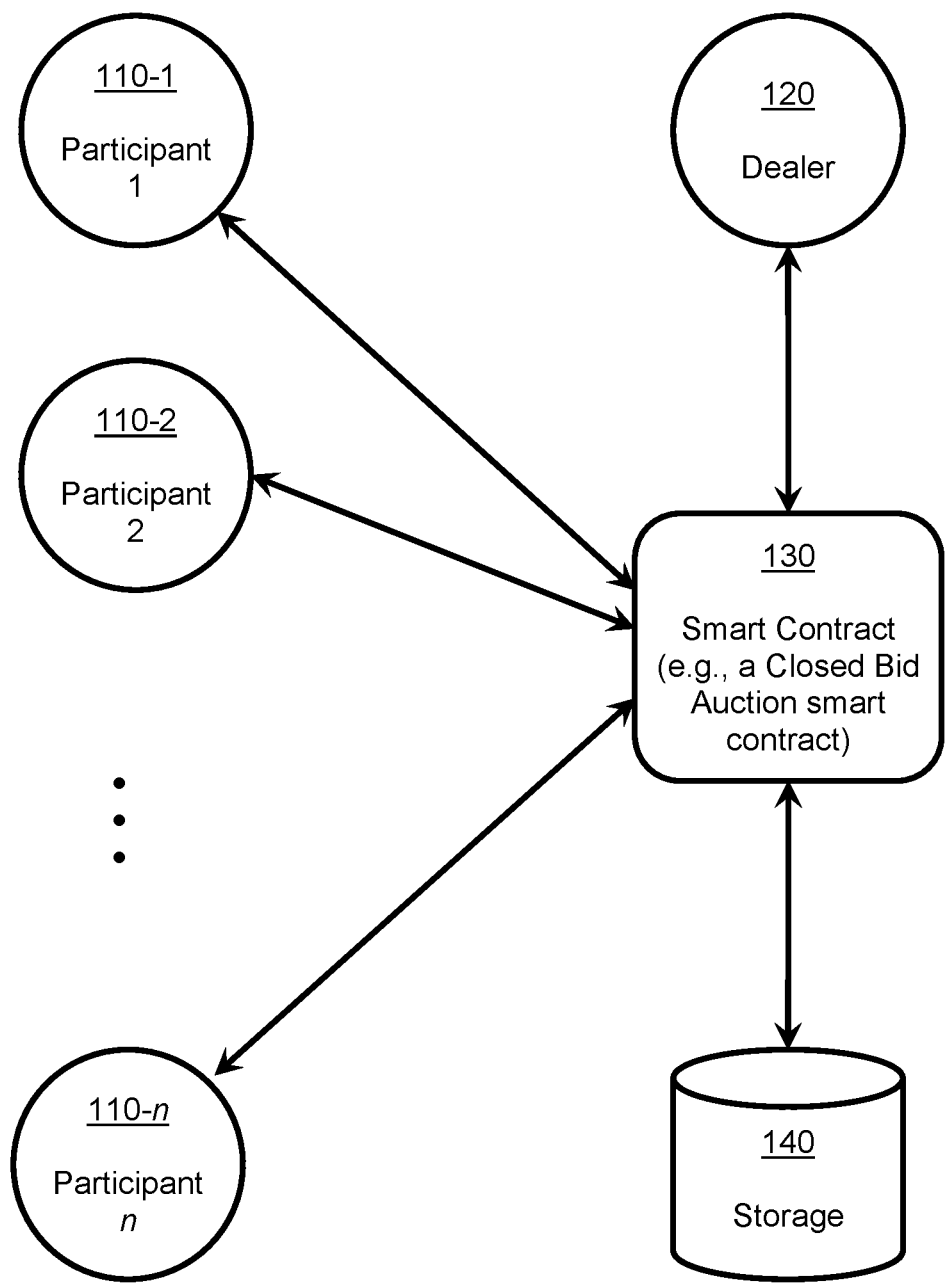
FIG. 1A is a network block diagram of a system for advancing a competitive scenario that proceeds in phases using a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide smart contracts with the ability to maintain information fairness while preserving the privacy of confidential information in competitive business scenarios.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members, and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In data encryption system parlance not limited to blockchains, a private encryption key may be referred to as a "secret". An encrypted secret sharing scheme is a procedure for splitting a secret into a plurality of different encrypted pieces, called shadows or shares. Markus Stadler discusses secret sharing in his work "Publicly verifiable secret sharing", International Conference on the Theory and Applications of Cryptographic Techniques, Springer Berlin Heidelberg, 1996, the entirety of which is hereby incorporated by reference as if fully set forth herein.

In the herein disclosed exemplary embodiments, a secret sharing scheme may comprise a dealer, a plurality (n) of participants $P_1, \ldots, P_n$, and an access structure $A \subseteq 2^{\{1, \ldots, n\}}$. A party that is granted access to a resource is called a qualified party; groups of qualified parties are called qualified sets; and all of the qualified sets considered as a whole is called the access structure of the system. In effect, the access structure is a description of who needs to cooperate with whom in order to access the resource. The access structure is monotone, which means if a set Z is in the access structure, all sets that contain Z as a subset also form part of the access structure. A secret sharing scheme in which a coalition of at least k participants can recover the secret is called a threshold secret sharing scheme, with threshold k. In embodiments, a smart contract (SC) can be used to perform at least some of the tasks that, if not for the SC, would be performed by the dealer, one or more participants, or both. Further, in embodiments, at least some of the inputs, outputs, and intermediate results may be stored using blockchain technology in computing environments controlled at least in part by the dealer and the participants.

In embodiments, the secret may be a private key S of a system-wide private/public key pair. The private key may be shared among participants by providing to each participant only an encrypted portion of the private key. To do so, the dealer (or SC) runs an algorithm on the private key to compute a number of shares $(s_1, \ldots s_n)$ equal to the number of participants n, and sends a different share $s_i$ to each participant $P_i$. Messages can then be encrypted using the system-wide public key that corresponds to the shared private key. The shares individually cannot decrypt the message, so the message remains encrypted until a coalition is formed comprising at least the threshold number of participants k. These participants must cooperate in a decryption protocol (or the SC can complete the protocol) to recover the private key S, which can then be used to decrypt an encrypted message.

One problem with such a secret sharing scheme is that it is not necessarily secure against dishonest participants who send false shares when the secret is to be recovered. Thereby, assembly of the private key from the shares $s_i$ is thwarted, which prevents decrypting the encrypted message. Another problem is that a dishonest dealer could distribute false shares. That may similarly thwart assembling a private key from the shares. A publicly verifiable secret sharing (PVSS) scheme can help guard against such issues. One framework for setting up a PVSS scheme is discussed by Berry Schoenmakers in the work "A simple publicly verifiable secret sharing scheme and its application to electronic voting", Annual International Cryptology Conference, Springer Berlin Heidelberg, 1999, the entirety of which is hereby incorporated by reference as if fully set forth herein.

In disclosed embodiments using PVSS, parties to the SC may include a dealer D and a plurality of participants $P_i$. In embodiments, three protocols may be defined to advance the competitive scenario in well-defined phases, referred to as initialization, distribution, and reconstruction protocols. In embodiments, the public key of a different public/private key pair may be registered to each participant $P_i$. Preferably, but not necessarily, the participants generate their own respective key pair, for example during the registration process, and provide their public key to the dealer (or SC). If the key pairs are generated elsewhere, the public and private keys are distributed so that the dealer maintains possession of the public keys, one of which is registered to each participant $P_i$, and the participant maintains possession of the corresponding private key. The dealer then generates a system-wide private/public key pair, and uses each participant $P_i$'s registered public key to generate a respective encrypted share $s_i$ of the system-wide private key, or "secret", S. The dealer then distributes each encrypted shares $s_i$ to the participant $P_i$ in possession of the corresponding private key. A message can then be encrypted using the system-wide public key, and the message cannot be decrypted until a coalition of participants forming a qualified set each use their private key to decrypt their respective share, and then combine the decrypted shares (or send them to the SC, which combines them) to recover the system-wide private key S.

In embodiments, any participant may run a verification algorithm to verify that all of the encrypted shares are valid, i.e., that no false shares were distributed. The algorithm need not involve communicating with other participants, and may be run by any participant that has received their share. The verification algorithm is called interactive if it requires communication with the dealer, and non-interactive if it does not. For every qualified set of participants in the access structure, any member of the set can confirm the validity of the encrypted shares of all the members, and therefore can be assured those shares can be combined to recover the secret S.

The initialization protocol includes generating any needed system parameters (e.g., for setting up a smart contract), generating as many private/public key pairs as there are participants, registering a unique public key to each participant $P_i$, (i=1, ..., n), and ensuring the participants each have the private key that corresponds to the public key registered to them. The registered public keys are used in the distribution protocol using an asymmetric encryption method $E_i$.

The distribution protocol includes two steps—the creation of a system-wide public/private key pair, and the generation and distribution of shares $s_i$ of the system-wide private key ("secret") S, each share encrypted using a different registered public key and sent to the corresponding registrant. The dealer may also publish a string $PROOF_D$ to prove that each $E_i$ produced a valid encrypted share $s_i$. The string $PROOF_D$ commits the dealer to use the system-wide secret S, and guarantees the reconstruction protocol will recover the same secret S.

Frameworks for generating strings for proving a share is true are discussed in Schoenmakers, and in the work by David Chaum and Torben Pryds Pedersen "Wallet databases with observers", Annual International Cryptology Conference, Springer Berlin Heidelberg, 1992, the entirety of which is hereby incorporated by reference as if fully set forth herein. In embodiments disclosed herein, the dealer first generates a respective share $s_i$ for each participant $P_i$, encrypts the share using that participant's registered public key and, for each participant $P_i$, the dealer provides the encrypted share $E_i(s_i)$. The dealer also publishes a string $PROOF_D$ to show that each $E_i$ encrypts a valid share $s_i$. Furthermore, the string $PROOF_D$ commits the dealer to one and only one secret S, and guarantees the reconstruction protocol will recover the same S.

With regard to the verification protocol, any party knowing all of the public keys for the encryption methods $E_i$ may verify all of the shares $s_i$. The public keys can be made available to the participants in any manner known in the art. For example, the Dealer may simply send them or post them in an accessible location for download. Each participant $P_i$ can thus run a non-interactive verification algorithm on the string $PROOF_D$ to verify that every $E_i(s_i)$ is a correct encryption of a share $s_i$. Since anyone may verify every share, no participant can legitimately contend any of the shares $s_i$ were incorrect when they were received. Thus, if any of the verifications fail, it is assumed that the dealer has failed, and the protocol is aborted.

The reconstruction protocol includes two steps-decrypting the shares, and pooling the decrypted shares to recover the secret S. The participants decrypt their shares $s_i$ using their respective private key corresponding to their $E_i(s_i)$. It is not necessary that all participants do so, but only the members of any qualified set of participants. Everyone in the qualified set must release (e.g., broadcast) their respective decrypted $s_i$, optionally including a string $PROOF_{Pi}$ showing the released share is true. The strings $PROOF_{Pi}$ are used to identify and exclude any participants that fail to produce their share $s_i$ correctly. Reconstruction of the system-wide private key S can be done using the shares of any qualified set of participants. The proofs may be non-interactive, so any member of a qualified group (or the SC) can gather the correct shares of the members of that group and confirm their validity. The members (or the SC) can also combine them by running a reconstruction algorithm to recover the system-wide secret S.

The exemplary inventive embodiments and aspects disclosed herein pertain to methods, devices, networks and/or systems, which support a smart contract for submitting bids or other confidential information in a competitive business scenario that comprises the foregoing protocols, and additionally takes advantage of a blockchain system. Some of the benefits of such a smart contract include the following. The complete protocol (i.e., terms of the smart contract) advances in phases, which ensures orderly execution. Furthermore, each party's input commitment (e.g., bid) is submitted as a message encrypted using the system-wide public key. Because each bid cannot be decrypted until the protocol to recover the system-wide private key is completed, participants cannot change their inputs after they are submitted. And, information fairness is achieved because publicly verifiable secret sharing is used such that any of the participants of a qualified group can confirm that all of the group's participants' shares are valid. Furthermore, all participants' inputs can be automatically revealed by a smart contract using blockchain technology responsive to a triggering event, such as a minimum threshold number of participants revealing their inputs. In addition, a blockchain implementation protects computational integrity by ensuring participants can conduct operations in a private manner for as long as is necessary and sufficient in their view, and also does not require any external elements such as a trusted third party.

Referring now to the figures, FIG. 1A is a simplified block diagram of a system 100 in which aspects of the systems and methods described herein may implemented. The system 100 includes, but is not limited to, participant user devices 110 (such as computers of bidders in a competitive business scenario), a dealer computer 120 (such as a server computer), a smart contract 130, and storage 140. The participants (1, . . . , n) are parties in a competitive business scenario who submit confidential information to the dealer 120 (who may be, for example, a business entity soliciting bids from the participants for a project). Smart contract 130 (or simply "contract") is typically a software entity comprising instructions executing in a tangible processing environment, such as a server computer or cloud. The contract is realized as specified actions or functions that are performed to advance the competitive business scenario toward completion of some or all of its goals. Thereby, the terms of the smart contract are automatically executed and fulfilled. Such actions or functions can include any number of calculations, communications, or the like, performed by the server computer or by connected or associated systems. Entities in system 100 are communicatively coupled, typically by a network infrastructure, which may include the Internet. Messages are communicated between parties and submitted as inputs for use by the smart contract to perform its actions or functions. In general, a smart contract 130 may be as simple as a payment transaction, or it may be much more complex, and include any number of executable code segments that may implement technical functions or business rules. As the smart contract advances, it may generate certain result information as outputs. It may also store inputs, intermediate results, outputs, and the like in storage 140.

In embodiments, the smart contract (SC) may perform some or all of the relevant computations and other tasks needed to advance the protocols of the disclosed methods. In effect in the following descriptions (unless otherwise specified), when inputs are described as being submitted by the dealer and participants, they may be understood to be submitted to, or intercepted or obtained by, the SC. Moreover, when calculations are attributed to the dealer or participants, the calculations may be understood to be accomplished by the SC on behalf of those parties. The SC may also generate, store, and/or distribute to the relevant parties keys, shares, and other relevant messages and information. And when outputs are described as generated by the dealer or participants, they may be understood to be generated and distributed by the SC on behalf of those parties.

Figure 1B:
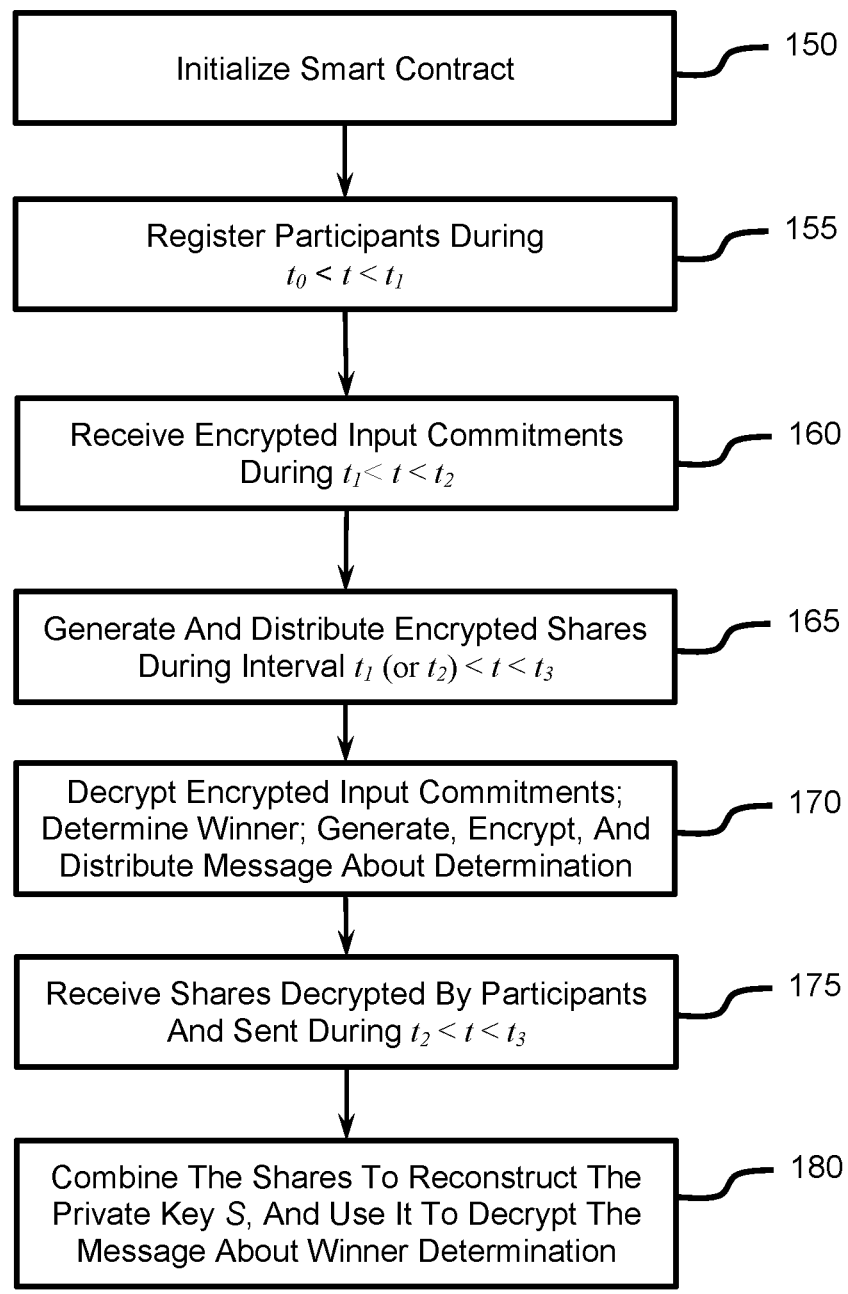
FIG. 1B is a flow diagram showing the progress of a competitive scenario that proceeds in phases, according to example embodiments.

FIG. 1B illustrates an exemplary method, such as may be performed in the system 145 illustrated in FIG. 1A. The method begins by initializing the SC, 150. To do so, three points in time (or block events) may be defined, $t_1$, $t_2$, and $t_3$; where $t_1$ is a time to end a participants registration phase; $t_2$ is a time to end an input commitment submission phase; and $t_3$ is a time to end an input commitment broadcast phase. With these times defined, the SC can begin to monitor a system clock (or block events), as well as participant and dealer communications. In addition, at any time between setup ($t_0$) and $t_2$, the dealer (or SC) may generate a system-wide public/private key pair. The times $t_1$, $t_2$, and $t_3$, and the system-wide public and private keys, can be stored in a genesis block of a block chain, on storage device 140, or both.

The method proceeds in the phases defined by conditions $t_1$, $t_2$, and $t_3$. The first phase proceeds during the interval $t_0 < t < t_1$, during which participants can register 155. In embodiments, each participant registers by submitting to the dealer (or to the SC) information such as participant identifying information, contact person information, and the like. In addition, a private/public key pair is generated for the benefit of the participant, preferably but not necessarily by the participant. The private key is kept by the participant, and the corresponding public key is registered to the participant and kept by the dealer (or SC). The first phase ends at time (or event) $t_1$, after which no more participants may register and no more public keys will be stored if any are submitted.

The second phase proceeds during the interval $t_1 < t < t_2$, during which the participants submit their input commitments (for example, bids in a confidential competitive bidding scenario). To do so, each participant provides and encrypts their input commitment using the private key that corresponds to the public key registered to them. The encrypted input commitment is submitted to the dealer (or to the SC). With every encrypted commitment received 160, the SC confirms the current time t is less than $t_2$. If so, the encrypted commitment is accepted and appended to the block chain (and may be stored in storage device 140) in association with the corresponding participant's ID. The second phase ends at time (or event) $t_2$, after which no more input commitments will be accepted if any are submitted.

In addition, at any time after $t_1$ (by which time all participants have registered), but preferably after $t_2$ (by which time all of the input commitments have been received, and participants who submitted an input commitment can be identified), the dealer (or SC) generates 165 a plurality of different portions of the system-wide private key S as shares $s_i$, and each is encrypted. To do so, an encrypted share generating algorithm is run against the private key S, using either the registered public keys of all of the registered participants (after $t_1$), or the registered public keys only of those who have timely submitted their encrypted input commitments (after $t_2$). Each encrypted share $s_i$ is then sent (165) to the participant $P_i$ to whom the public key is registered that was used to generate that encrypted share. In embodiments, each share may be provided with a string PROOF$_D$ to show the share is valid. The PROOF$_D$ is calculated by the dealer (or by the SC).

The third phase proceeds during the interval $t_2<t<t_3$, after all encrypted input commitments have been received. Being in possession of or having access to the public keys that correspond to the private keys the participants used to encrypt their input commitments, the dealer (or SC) decrypts those commitments 170. A prevailing participant (i.e., a winner) can then be selected or determined (170) in accordance with one or more rules. The dealer (or SC) can then distribute any desired information pertaining to the prevailing participant, or the prevailing bid, or information of any of the participants, or their bids, or simply that a winner has been selected. For example, a document or the like can be generated containing any of this information desired (170). This document may then be encrypted using the system-wide public key, and the encrypted document or similar message may be sent or made available to the participants (170). At time $t_3$, the terms of the smart contract have all been satisfied with regard to the dealer.

Participants can decrypt their shares using their respective private keys, and broadcast or otherwise reveal their decrypted shares 175 to the other participants (if they are known). Alternatively the shares can be distributed or made available to the other participants via the dealer (or the SC). In embodiments, a participant may reveal their share in conjunction with a PROOF$_{Pi}$, confirming their revealed unencrypted share is valid.

When a sufficient number (i.e., at least a threshold number) of participants have decrypted and revealed their shares, (i.e., constituting a qualified set of participants in the access structure), anyone (or the SC) with access to those decrypted shares can use them to reconstruct the system-wide private key S by following the reconstruction protocol 180. The reconstructed key S can then be used by the participants now in possession of the private key S to decrypt the encrypted message containing the information distributed by the dealer (or SC) (180) that satisfied the smart contract with regard to the dealer. In embodiments, at least one of the private key S and the decrypted message is appended to the blockchain.

The foregoing method protects computational integrity by ensuring participants can conduct operations in a private, confidential manner for as long as is necessary and sufficient. It does not require any external components, such as a trusted third party. In addition, it achieves information fairness among participants. That is, all input commitment information is necessarily kept confidential (because it's encrypted) and optionally ensured (if proofs are used) until a threshold number of participants reveal their unencrypted shares. The shares can be used to reconstruct the private key that decrypts the information sent at the conclusion of the contract, for example, the input commitments of all of the participants, or information of the prevailing participant or commitment, or the like. Nearly all of this process can automatically be accomplished by the smart contract, which can make all of the decrypted information available to all of the participants at the same time (such as by posting it to an accessible location), or can distribute it to the participants, or both.

In the disclosed embodiments, the foregoing process is accomplished using blockchain technology. Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the disclosed embodiments may provide a technical solution where a gap in the prior art exists. Embodiments can apply PVSS in new types of applications, such as bidding scenarios in which a plurality of bidders submit bids that cannot be altered. Upon a trigger consisting of at least a threshold number of bidders decrypting and making available their shares of the system-wide private key S, information of the determination of a prevailing participant, an identifier of the prevailing participant, any information pertaining to participants and their bids, or a combination of these, may be automatically revealed at essentially the same time to all bidders.

The advantages of the disclosed embodiments are possible due to the immutability, encryption-based privacy, and distributed accessibility which are inherent and unique to blockchain. In particular, these advantages can be achieved using a publicly verifiable secret sharing scheme executed as a smart contract. This can be especially valuable, for example, in a scenario in which inputs are collected in confidence from a variety of participants, such as in a lowest unique bid auction or a second price auction, and functions and computations are executed based on the inputs. This can all be achieved while ensuring the fulfillment of any number of contractual, transactional, and other requirements, pre-conditions, post-conditions, and the like, all while enforcing information fairness and preserving the privacy and secrecy of participants' inputs.

The smart contract, and its inputs and outputs, may be included in the blockchain ledger. In an exemplary embodiment, there may be two stages of development of a blockchain in the ledger. First, a consensus log may be developed, which is an ordered log of "transactions," such as performing calculations and sending messages. The transactions of the consensus log are executed sequentially. After such execution the outputs of the smart contract may be entered into the ledger in blocks of the blockchain. Other blockchain implementations and/or aspects may additionally or alternatively be used.

Figure 2A:
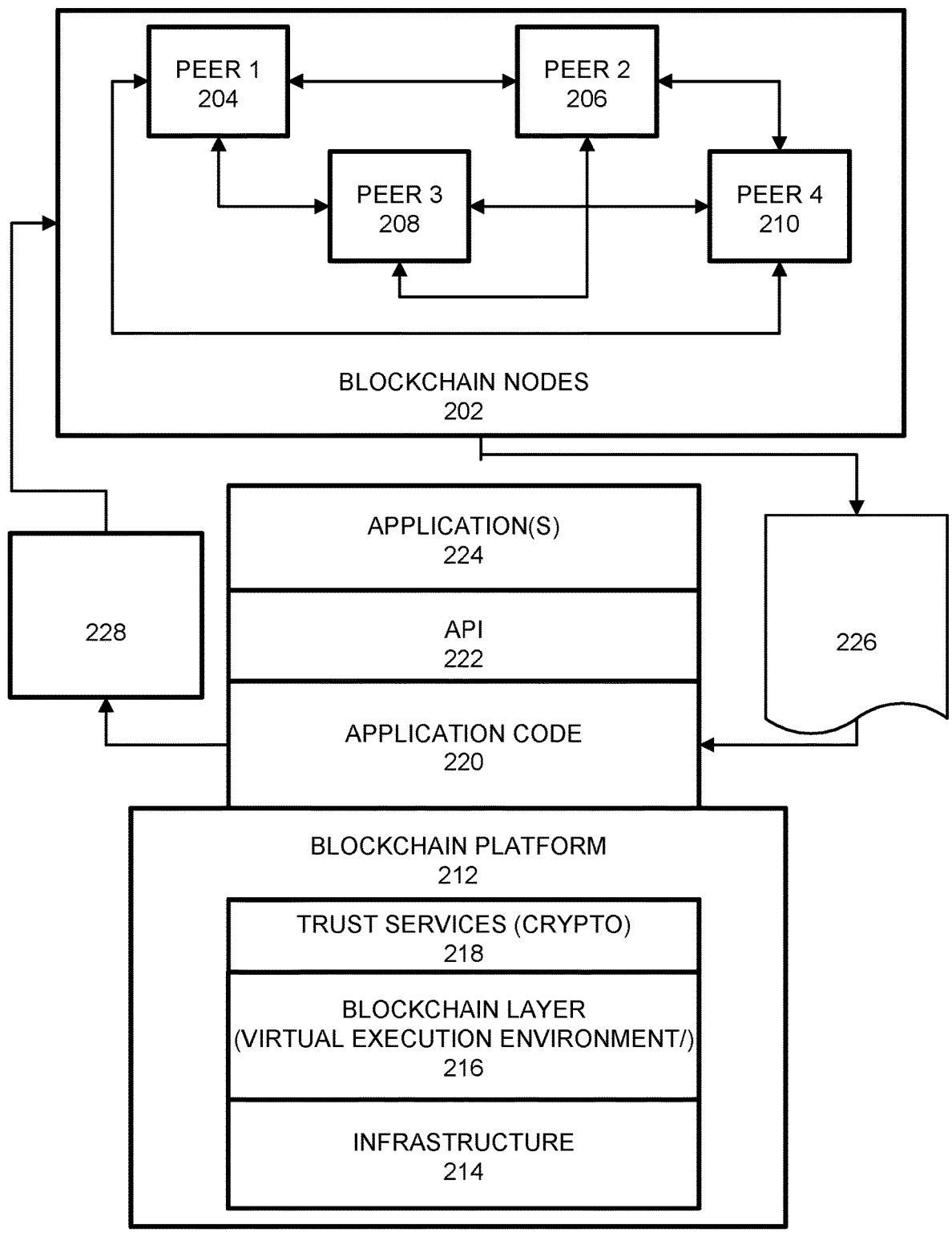
FIG. 2A illustrates an example peer node blockchain architecture configuration for advancing a competitive scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only), which may include nodes such as the participants 110 and dealer 120 of FIG. 1A. These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, initializing information 226 of the smart contract may include inputs representing a time $t_1$ to end a participant set determination phase; a time $t_2$ representing a time to end submission of input commitments, which are encrypted before being submitted; and a time $t_3$ representing a time to end broadcast of information regarding selection of a prevailing participant, input commitments, participant identities, or other smart contract concluding information. Then, when a bidding window opens during which bids may be submitted by participants, the smart contract may begin reading a clock at time $t_0$. Thereafter, the smart contract may determine that ($t_1 > t_0$ and $t_2 > t_1$ and $t_3 > t_2$) to advance the business scenario in controlled phases. In embodiments, "time" may be counted in terms of new block events, or as a duration between such events, or as a predetermined point in time. This determination may be processed by one or more processing entities (e.g., virtual machines) included in the blockchain layer 216. The result 228 may include writing $t_0$, $t_1$, $t_2$, and $t_3$ to the blockchain, to permanent storage, or both. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, for example, that could include registering participants, receiving encrypted input commitments, generating and distributing encrypted shares, and the like. Functions may include generating and distributing encrypted shares, which may be provided to one or more of the nodes 204-210.

Figure 2B:
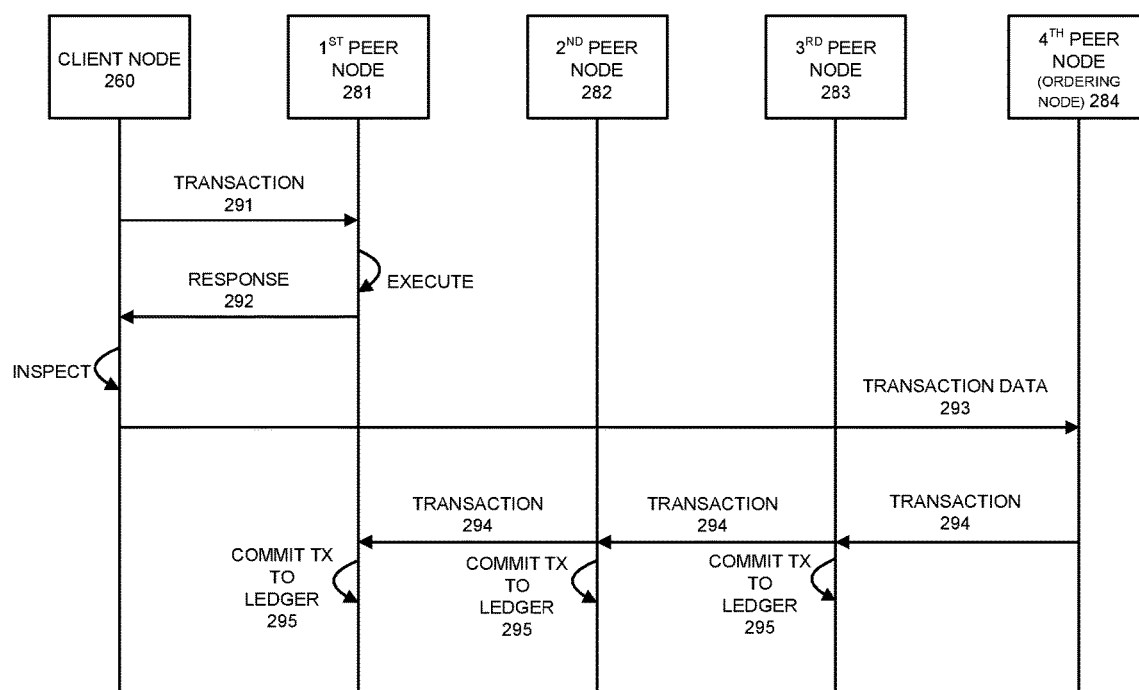
FIG. 2B illustrates an example peer node blockchain transaction configuration, according to example embodiments.

FIG. 2B illustrates an example of a transactional flow 250 between nodes of the blockchain in accordance with exemplary embodiments. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

The disclosed embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example computer system architecture 300, which may represent or be integrated in any of the above-described components, etc.

Figure 3:
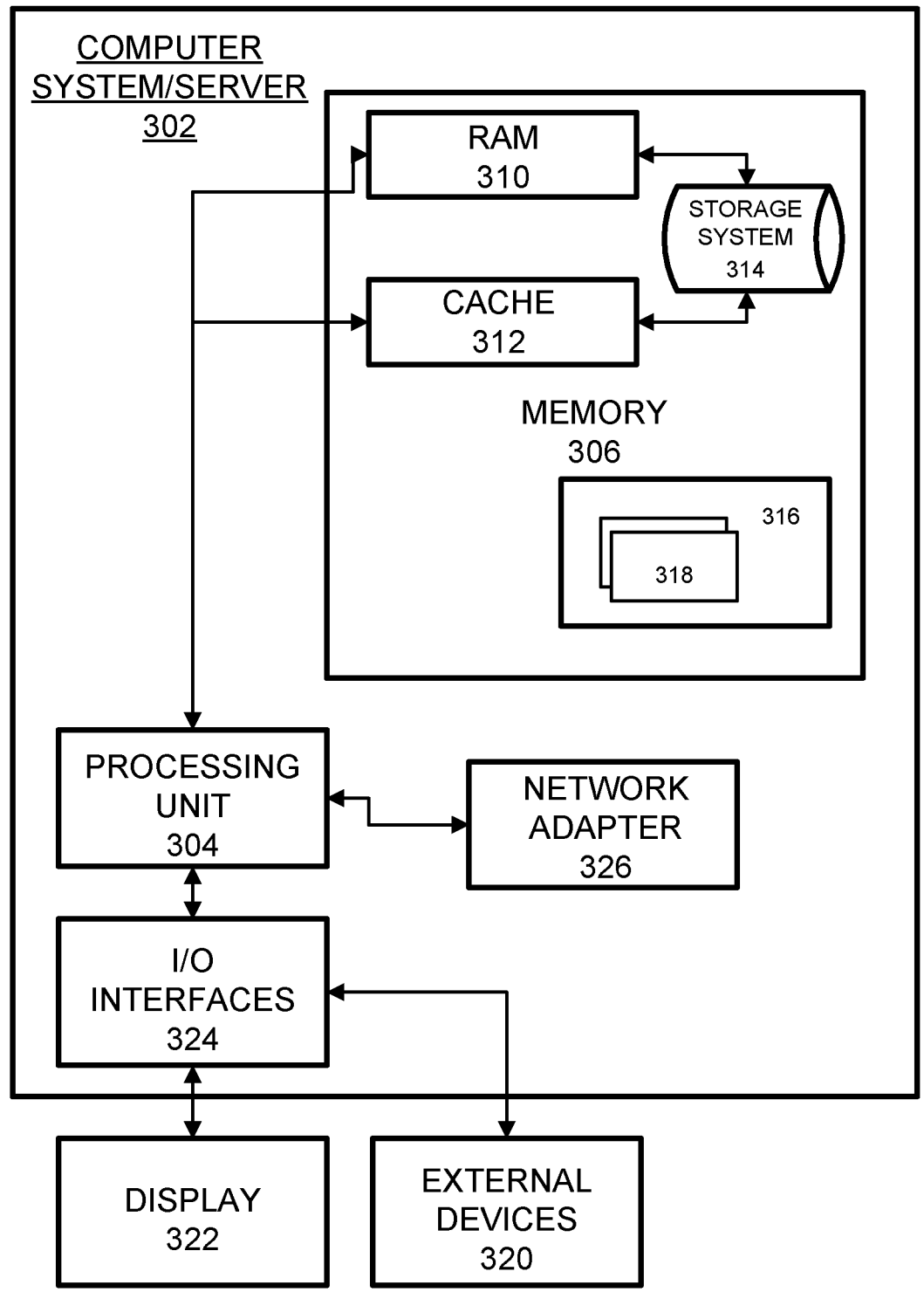
FIG. 3 illustrates an example computer system configured to support one or more of the example embodiments.

FIG. 3 is not intended to suggest any limitation as to the scope of use or functionality of embodiments of the application described herein. Regardless, the computing node 300 is capable of being implemented and/or performing any of the functionality set forth herein.

In computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 302 in cloud computing node 300 is shown in the form of a general-purpose computing device. The components of computer system/server 302 may include, but are not limited to, one or more processors or processing units 304, a system memory 306, and a bus that couples various system components including system memory 306 to processor 304.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media. System memory 306, in one embodiment, implements the flow diagrams of the other figures. The system memory 306 can include computer system readable media in the form of volatile memory, such as random-access memory (RAM) 310 and/or cache memory 312. Computer system/server 302 may further include other removable/non-removable, volatile/non-volatile computer system storage media. By way of example only, storage system 314 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 306 may include at least one program product having a set (e.g., at least one) of program modules that are configured to carry out the functions of various embodiments of the application.

Program/utility 316, having a set (at least one) of program modules 318, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 318 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 302 may also communicate with one or more external devices 320 such as a keyboard, a pointing device, a display 322, etc.; one or more devices that enable a user to interact with computer system/server 302; and/or any devices (e.g., network card, modem, etc.) that enable computer system/server 302 to communicate with one or more other computing devices. Such communication can occur via I/O interfaces 324. Further, computer system/server 302 can communicate with one or more networks such as a local area network (LAN), a general wide area network (WAN), and/or a public network (e.g., the Internet) via network adapter 326. As depicted, network adapter 326 communicates with the other components of computer system/server 302 via a bus. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   initializing a smart contract and appending it to a blockchain;
   registering each of a plurality of participants as a party to the smart contract;
   generating a system-wide public/private key pair and storing the generated system-wide public key in a genesis block of the blockchain;
   calculating a unique share of the system-wide private key for each participant who provided a confidential input commitment, and encrypting the unique share using the public key of one of the participants;
   sending each of the encrypted unique shares to the participant having the private key corresponding to the public key used to encrypt the share;
   opening a bidding window for the plurality of participants and begin counting block events that occur on the blockchain;
   receiving from at least some of the participants an encrypted confidential input commitment during the open bidding window, each encrypted confidential input being encrypted with the system-wide public key;
   terminating, via the smart contract, the open bidding window when the counting reaches a predetermined threshold and denying any other encrypted input commitments received after the termination of the open bidding window via the smart contract;
   appending the encrypted input commitments to the blockchain;
   recovering the private key based on decrypted unique shares of the system-wide private key that are shared by a predetermined number of participants;
   decrypting the encrypted input commitments based on the recovered private key and storing the decrypted input commitments on the blockchain;
   executing, by the smart contract, at least one business rule using the decrypted input commitments to obtain a business rule result; and
   identifying a prevailing participant based at least in part on the business rule result.

2. The method of claim 1, wherein:
   parameters for initializing the smart contract are obtained from a dealer;
   the terms of the smart contract pertain to the plurality of participants and the dealer, each of which controls their own computing environment; and
   the blockchain is implemented at least in part on the computing environments.

3. The method of claim 1, wherein the registering of each of the plurality of participants includes:
   receiving identification information of a participant;
   obtaining a public key of a public/private key pair for which the participant has the corresponding private key; and
   storing the public key in association with identification information of the participant.

4. The method of claim 1, further comprising:
   generating a message including information for identifying the prevailing participant of a bidding process;
   encrypting the message using the system-wide public key; and
   making the encrypted message available to the plurality of participants.

5. The method of claim 1, wherein the recovering comprises:
   receiving decrypted unique shares from at least a predetermined threshold number of the plurality of participants using their respective private keys; and
   combining the decrypted unique shares to reconstruct the system-wide private key.

6. The method of claim 5, further comprising:
   calculating a string $PROOF_D$ that can be used to prove the shares of the system-wide private key are valid, sending the string $PROOF_D$ with each of the encrypted shares, and appending the string $PROOF_D$ to the blockchain.

7. A system, comprising:
   a processor configured to:
      initialize a smart contract and append it to a blockchain;
      register each of a plurality of participants as a party to the smart contract;
      generate a system-wide public/private key pair and storing the generated system- wide public key in a genesis block of the blockchain;
      calculate a unique share of the system-wide private key for each participant who provided a confidential input commitment, and encrypting the unique share using the public key of one of the participants;
      send each of the encrypted unique shares to the participant having the private key corresponding to the public key used to encrypt the share;
      open a bidding window for the plurality of participants and begin counting block events that occur on the blockchain;
      receive from at least some of the participants an encrypted confidential input commitment during the open bidding window, each encrypted confidential input being encrypted with the system-wide public key;
      terminate, via the smart contract, the open bidding window when the counting reaches a predetermined threshold and deny any other encrypted input commitments received after the termination of the open bidding window via the smart contract;
      append the encrypted input commitments to the blockchain;
      recover the private key based on decrypted unique shares of the system-wide private key that are shared by a predetermined number of participants;
      decrypt the encrypted input commitments based on the recovered private key and storing the decrypted input commitments on the blockchain;
      execute, by the smart contract, at least one business rule based on the decrypted input commitments to obtain a business rule result; and identify a prevailing participant based at least in part on the business rule result.

8. The system of claim 7, wherein:
parameters to initialize the smart contract are obtained from a dealer;
terms of the smart contract pertain to the plurality of participants and the dealer, each of which controls their own computing environment; and
the blockchain is implemented at least in part on the computing environments.

9. The system of claim 7, wherein the processor is further configured to:
receive identification information of a participant;
obtain a public key of a public/private key pair for which the participant has the private key; and
store the public key in association with identification information of the participant.

10. The system of claim 7, wherein the processor is further configured to:
generate a message that includes information that identifies a prevailing participant of a bidding process;
encrypt the message based on the system-wide public key; and
make the encrypted message available to the plurality of participants.

11. The system of claim 7, wherein the processor is further configured to:
receive decrypted unique shares from at least a predetermined threshold number of the plurality of participants based on their respective private keys; and
combine the decrypted unique shares to reconstruct the system-wide private key.

12. The system of claim 11, wherein the processor is further configured to:
calculate a string $PROOF_D$ that can be used to prove the shares of the system-wide private key are valid, send the string $PROOF_D$ with each of the encrypted shares, and append the string $PROOF_D$ to the blockchain.

13. A computer program product comprising a non-transitory computer readable medium and instructions stored on the non-transitory computer readable medium which when executed by a processor cause a computer to perform a method comprising:
initializing a smart contract and appending it to a blockchain;
registering each of a plurality of participants as a party to the smart contract;
generating a system-wide public/private key pair and storing the generated system-wide public key in a genesis block of the blockchain;
calculating a unique share of the system-wide private key for each participant who provided a confidential input commitment, and encrypting the unique share using the public key of one of the participants;
sending each of the encrypted unique shares to the participant having the private key corresponding to the public key used to encrypt the share;
opening a bidding window for the plurality of participants and begin counting block events that occur on the blockchain;
receiving from at least some of the participants an encrypted confidential input commitment during the open bidding window, each encrypted confidential input being encrypted with the system-wide public key;
terminating, via the smart contract, the open bidding window when the counting reaches a predetermined threshold and denying any other encrypted input commitments received after the termination of the open bidding window via the smart contract;
appending the encrypted input commitments to the blockchain;
recovering the private key based on decrypted unique shares of the system-wide private key that are shared by a predetermined number of participants;
decrypting the encrypted input commitments based on the recovered private key and storing the decrypted input commitments on the blockchain;
executing by the smart contract, at least one business rule using the decrypted input commitments to obtain a business rule result.

14. The computer program product of claim 13, wherein:
parameters for initializing the smart contract are obtained from a dealer;
the terms of the smart contract pertain to the plurality of participants and the dealer, each of which controls their own computing environment; and
the blockchain is implemented at least in part on the computing environments.

15. The computer program product of claim 13, wherein the registering of each of the plurality of participants includes:
receiving identification information of a participant;
obtaining a public key of a public/private key pair for which the participant has the corresponding private key; and
storing the public key in association with identification information of the participant.

16. The computer program product of claim 13, wherein the method further comprises:
generating a message including information for identifying a prevailing participant of a bidding process;
encrypting the message using the system-wide public key; and
making the encrypted message available to the plurality of participants.

17. The computer program product of claim 13, wherein the recovering comprises:
receiving decrypted unique shares from at least a predetermined threshold number of the plurality of participants using their respective private keys; and
combining the decrypted shares to reconstruct the system-wide private key.

* * * * *